(12) United States Patent
Cox et al.

(10) Patent No.: US 11,315,157 B1
(45) Date of Patent: *Apr. 26, 2022

(54) AGGREGATOR APPLICATION APP FOR A MOBILE ELECTRONIC DEVICE

(71) Applicant: AUTOFX2 LLC, Katy, TX (US)

(72) Inventors: Brent W. Cox, Katy, TX (US); Michael A. Hergenrader, Katy, TX (US); Peter R. Baldwin, Aledo, TX (US)

(73) Assignee: AutoFX2 LLC, Katy, TX (US)

( * ) Notice: Subject to any disclaimer, the term of this patent is extended or adjusted under 35 U.S.C. 154(b) by 332 days.

This patent is subject to a terminal disclaimer.

(21) Appl. No.: 16/532,139

(22) Filed: Aug. 5, 2019

Related U.S. Application Data

(63) Continuation of application No. 15/618,717, filed on Jun. 9, 2017, now Pat. No. 10,402,874, which is a continuation of application No. 13/804,599, filed on Mar. 14, 2013, now Pat. No. 9,704,186.

(60) Provisional application No. 61/621,687, filed on Apr. 9, 2012.

(51) Int. Cl.
G06Q 30/06 (2012.01)
G06Q 40/02 (2012.01)
G06Q 30/00 (2012.01)

(52) U.S. Cl.
CPC ....... *G06Q 30/0601* (2013.01); *G06Q 30/018* (2013.01); *G06Q 30/0609* (2013.01); *G06Q 40/025* (2013.01)

(58) Field of Classification Search
CPC ....... G06Q 30/018; G06Q 30/06–0645; G06Q 30/08; G06Q 40/025; G06Q 50/01; G16Y 10/00–90
See application file for complete search history.

(56) References Cited

U.S. PATENT DOCUMENTS

| | | | |
|---|---|---|---|
| 7,447,656 B2 | 11/2008 | Parthasarathy | |
| 8,428,978 B1 | 4/2013 | Smith | |
| 8,671,050 B1* | 3/2014 | Sandoval | G06Q 40/00 705/38 |
| 9,836,793 B2* | 12/2017 | Busque | G16H 10/40 |
| 2009/0112744 A1* | 4/2009 | Park | G06Q 40/025 705/34 |

(Continued)

*Primary Examiner* — Adam L Levine
(74) *Attorney, Agent, or Firm* — Nasr Patent Law LLC; Faisal K. Abou-Nasr

(57) ABSTRACT

A mobile electronic device is described that is configured to upload a commercial application to a centralized server. In an implementation, the mobile electronic device includes a memory, and a processor communicatively coupled to the memory. The mobile electronic device also includes an aggregator module stored in memory and executable by the processor. The module is also configured to instruct the processor to aggregates the product information with applicant information to generate a commercial application relating to the product, the commercial application comprising an application for services from at least one a lending entity, an insurance entity, or a third-party service entity. The module is also configured to instruct the processor to cause transmission of the commercial application to a central server. The commercial application is accessible to the at least one of the lending entity, the insurance entity, or the third-party service entity.

20 Claims, 15 Drawing Sheets

(56) References Cited

U.S. PATENT DOCUMENTS

| | | | |
|---|---|---|---|
| 2009/0171822 A1* | 7/2009 | Meadow | G06Q 40/025 |
| | | | 705/30 |
| 2010/0088123 A1* | 4/2010 | McCall | G06Q 40/08 |
| | | | 705/4 |
| 2010/0174564 A1 | 7/2010 | Stender et al. | |
| 2010/0257109 A1 | 10/2010 | Melleis et al. | |
| 2010/0312691 A1 | 12/2010 | Johnson, Jr. | |
| 2011/0161117 A1* | 6/2011 | Busque | G06Q 20/3278 |
| | | | 705/4 |
| 2011/0264552 A1 | 10/2011 | Seergy et al. | |
| 2012/0296702 A1* | 11/2012 | Fontana | G06Q 30/06 |
| | | | 705/7.35 |

* cited by examiner

Employer

| Employer's Name | Name |
| Job Title | Title |
| Length of Employment | 0 years > |

| Income Before Taxes | $0.00 |

| Second Income | > |

*If the registration title owner names will be different from the names on this loan application, additional signed documentation may be required.*

[ Save ]   [ Back ]

FIG. 2H (cont.)

AGGREGATOR APPLICATION APP FOR A MOBILE ELECTRONIC DEVICE

CROSS-REFERENCE TO RELATED APPLICATIONS

The present application is a continuation of U.S. Non-Provisional application Ser. No. 15/618,717 (U.S. Pat. No. 10,402,874), entitled AGGREGATOR APPLICATION APP FOR A MOBILE ELECTRONIC DEVICE, filed on Jun. 6, 2017, which is a continuation of U.S. Non-Provisional application Ser. No. 13/804,599 (U.S. Pat. No. 9,704,186), entitled AGGREGATOR APPLICATION APP FOR A MOBILE ELECTRONIC DEVICE, filed on Mar. 14, 2013, which claims the benefit under 35U.S.C. § 119(e) of U.S. Provisional Application Ser. No. 61/621,687, entitled COMMERCIAL AGGREGATOR APP FOR A MOBILE ELECTRONIC DEVICE, filed on Apr. 9, 2012. U.S. Provisional Application Ser. No. 61/621,687 is herein incorporated by reference in its entirety.

BACKGROUND

Application software ("an app") is computer software designed to assist a user in performing one or more specific tasks. In implementations, application software includes, but is not limited to: enterprise software, mobile application software, graphics software, media players, or the like.

SUMMARY

A mobile electronic device is described that is configured to upload a commercial application to a centralized server that is accessible by a lending entity's (e.g., a bank, an insurer, a financial service company, a lending service (i.e., a commercial lending entity/sub-lending entity)), a commercial company's server for applying for a loan and/or a loan pre-approval from the lending entity, an insurance entity, or a third-service party service provider (i.e., that provides extended warranties or other related services). In an implementation, the mobile electronic device includes a memory, and a processor communicatively coupled to the memory. The mobile electronic device also includes an aggregator module stored in memory and executable by the processor. The aggregator module is configured to instruct the processor to retrieves product information associated a product (e.g., a vehicle, homes, equipment, boats, airplanes, recreational vehicles, all-terrain vehicles, jewelry, furniture, art, etc.). The module is also configured to instruct the processor to aggregates the product information with applicant information to generate a commercial application relating to the product, the commercial application comprising an application for services from at least one a lending entity, an insurance entity, or a third-party service entity. The module is also configured to instruct the processor to cause transmission of the commercial application to a central server. The commercial application is accessible to the at least one of the lending entity, the insurance entity, or the third-party service entity (i.e., an extended warranty provider, an inspection and/or appraisal (of asset) entity, etc.).

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1A:
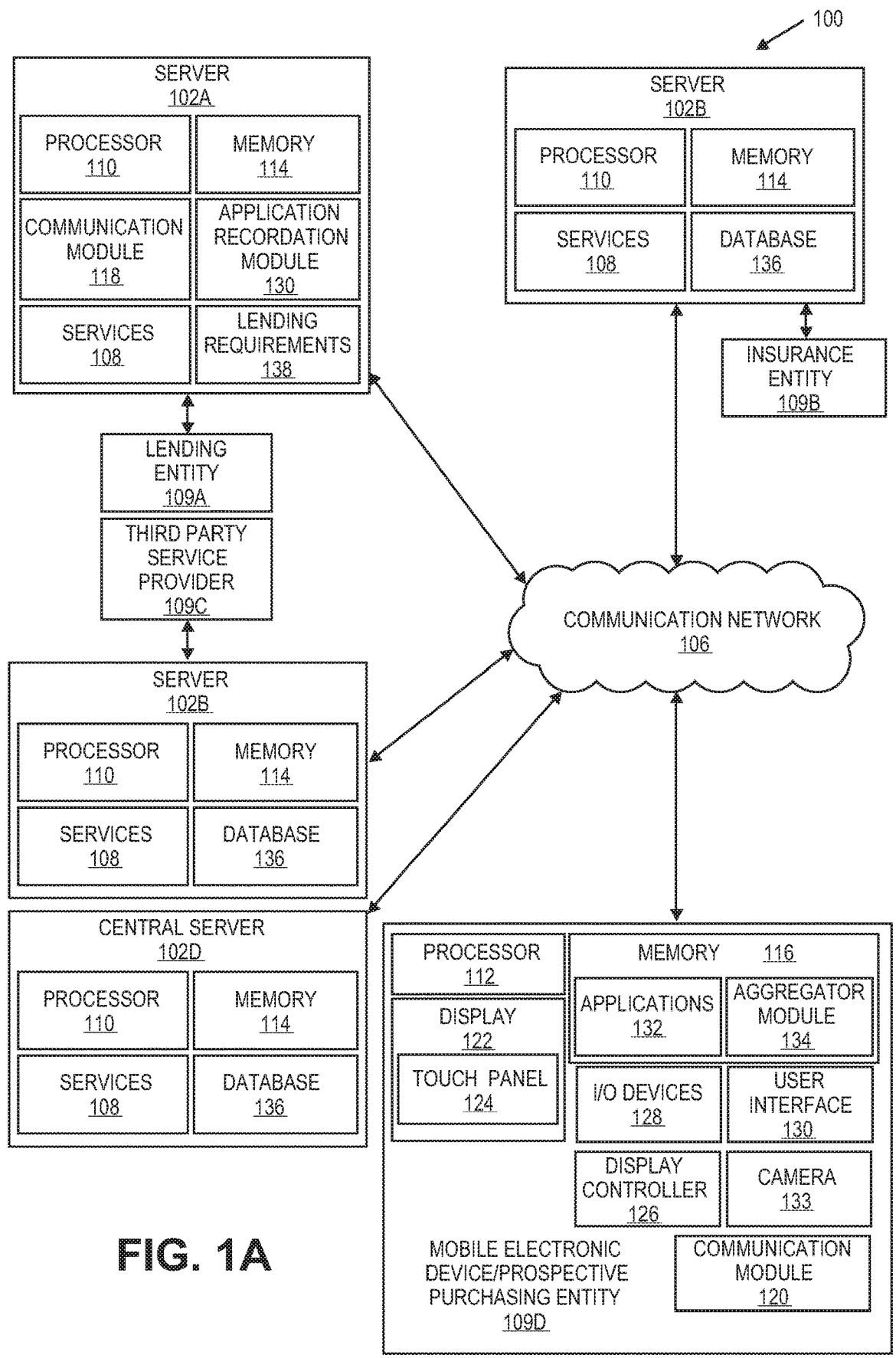
FIG. 1A is a block diagram of a system in accordance with example implementations of the present disclosure.

FIG. 1A illustrates a system 100 for providing applicant and product information to a centralized repository. For example, product information can be submitted to a central repository for pre-approving a loan to purchase a product based upon a lending entity's criteria, receiving insurance, or an insurance quote, for the product, receiving warranty coverage, or a warranty coverage quote, for the product, or the like. As shown, the system 100 includes one or more servers 102 that are configured to communicate with a mobile electronic device 104 over a communication network 106. In one or more implementations, the mobile electronic device 104 may be a mobile phone (e.g., a smartphone device); a tablet computer; a personal digital assistant (PDA); or the like. In an implementation, the mobile electronic device 104 is configured to communicate with one or more services 108 provided by the servers 102. Services 108 may include loan application services offered by lending entities, insurance services offered by insurance entities, and so forth. As shown in FIG. 1A, the system 100 includes multiple servers 102A, 102B, 102C, 102D that are associated with various entities associated with a lending or commercial process. For example, server 102A may be associated with a lending entity 109A, server 102B may be associated with an insurance entity 109B, and server 102C may be associated with other third-party service providers 109C (i.e., an extended warranty provider, an inspection and/or appraisal (of asset) entity, etc.). Server 102D may be configured as a centralized server that provides repository functionality to servers 102A, 102B, 102C. In an implementation, server 102D is configured to receive and store digital content (e.g., data representing a loan applicant's information, data representing one or more digital images, data representing one or more digital videos, etc.) from one or more mobile electronic devices 104. In turn, servers 102A, 102B, 102C are provided access to the digital content via server 102D. For example, the lending entity 109A may wish to access server 102D by way of server 102A to receive the data representing the loan applicant's application information to determine whether to pre-approve a loan amount for the loan applicant. In another example, the insurance entity 109B may wish to access server 109D by way of server 102B to receive data representing an insurance applicant's vehicle information to determine terms of an insurance policy for the vehicle. In yet another example, a warranty service provider (e.g., third-party service provider 109C) may wish to access server 109D by way of server 102C to receive data representing a digital image and/or a digital video of a vehicle to determine terms of a warranty for the vehicle. It is understood that servers 102A, 102B, 102C, 102D may be implemented in a number of ways. For example, servers 102A, 102B, 102C, 102D may be implemented as physical servers, virtual servers (e.g., server functionality implemented within a cloud computing architecture), combinations thereof, or the like.

Lending entity 109A may offer various financial products to a prospective purchasing entity 109D (e.g., loan applicant). The lending entity 109A can include a private, public, or institutional entity (e.g., a financial institution) that makes funds available may make funds available to a prospective purchasing entity 109D (e.g., a person) to borrow. It is understood that lending entity 109A may include, but is not limited to: a bank, a commercial lending entity, a commercial sub-lending entity, or the like. The prospective purchasing entity 109D can include a purchaser of one or more products (e.g., vehicles, homes, equipment, boats, airplanes, recreational vehicles, all-terrain vehicles, jewelry, furniture, art, etc.). For instance, the prospective purchasing entity 109D can borrow funds from the lending entity 109A to purchase the one or more products from a selling entity. As described herein, the prospective purchasing entity 109D is a user of the mobile electronic device 104. The prospective purchasing entity 109D can utilize the mobile electronic device 104 to apply for loan pre-approval from a lending entity 109A to provide the prospective purchasing entity 109D a single source for purchasing the product. For example, while at a vehicle dealership, the prospective purchasing entity 109D may utilize the mobile electronic device 104 to apply for loan pre-approval to purchase a vehicle from the dealership. In another example, the prospective purchasing entity 109D may utilize the mobile electronic device 104 to apply for an insurance policy for an insurance eligible product (e.g., the vehicle at the dealership). In yet another example, the prospective purchasing entity 109D may utilize the mobile electronic device 104 to apply for additional warranty protection for a warranty eligible product (e.g., the vehicle at the dealership). However, it is understood that the prospective purchasing entity 109 may utilize the mobile electronic device 104 to interface with other third-party services.

As shown in FIG. 1A, the servers 102A, 102B, 102C, 102D and the mobile electronic device 104 each include a respective processor 110, 112 and a respective memory 114, 116. The processors 110, 112 provide processing functionality for the server 102 and the mobile electronic device 104, respectively. The processors 110, 112 may include any number of processors, micro-controllers, or other processing systems and resident or external memory for storing data and other information accessed or generated by the server 102 and/or the mobile electronic device 104. The processors 110, 112 may execute one or more software programs (e.g., modules) that implement techniques described herein.

The memory 114, 116 is an example of tangible computer-readable media that provides storage functionality to store various data associated with the operation of the server 102 and the mobile electronic device, such as the application 109 software code mentioned above, or other data to instruct the processors 110, 112 and other elements of the server 102 (mobile electronic device 104) to perform the steps described herein.

The server 102 is communicatively coupled to the mobile electronic device 104 over a communication network 106 through communication modules 118, 120 included in the server 102 and the mobile electronic device 104, respectively. The communication modules 118, 120 may be representative of a variety of communication components and functionality, including, but not limited to: one or more antennas; a browser; a transmitter and/or receiver (e.g., radio frequency circuitry); a wireless radio; data ports; software interfaces and drivers; networking interfaces; data processing components; and so forth.

The communication network 106 may comprise a variety of different types of networks and connections that are contemplated, including, but not limited to: the Internet, an intranet; a satellite network; a cellular network; a mobile data network; wired and/or wireless connections; and so forth.

Wireless networks may comprise any of a plurality of communications standards, protocols and technologies, including, but not limited to: Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11 g and/or IEEE 802.11 n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS), and/or Short Message Service (SMS)), or any other suitable communication protocol.

As shown in FIG. 1A, the mobile electronic device 104 includes a touch-sensitive display 122, which can be implemented using a liquid crystal display, an organic light emitting diode display, or the like. In some embodiments, the touch-sensitive display 122 may include a touch panel 124. The touch panel 124 may be, but is not limited to: a capacitive touch panel, a resistive touch panel, an infrared touch panel, combinations thereof, and the like. Thus, the display 122 may be configured to receive input from a user and display information to the user of the mobile electronic device 104. For example, the display 122 displays visual output to the user. The visual output may include graphics, text, icons, video, interactive fields configured to receive input from a user, and any combination thereof (collectively termed "graphics"). In some embodiments, some or all of the visual output may correspond to user-interface objects, further details of which are described below.

The display 122 is communicatively coupled to a display controller 126 that is configured to receive and/or transmit electrical signals to the touch-sensitive display 122. In an implementation, the touch panel 124 includes a sensor, an array of sensors, or the like, configured to accept input from a user based upon haptic and/or tactile contact. The touch panel 124, in combination with the display controller 126 (along with any associated modules and/or sets of computer-readable instructions in memory 116), detects a point of contact (or points of contact), as well as any movement or breaking of the contact, on the touch panel 124 and converts the detected contact (e.g., a finger of the user, a stylus, etc.)

into electrical signals representing interactions with user-interface objects (e.g., buttons, custom views, icons, web pages, images, web page links, etc.) that are displayed through the display 122. The mobile electronic device 102 may further include one or more input/output (I/O) devices 128 (e.g., a keypad, buttons, a wireless input device, a thumbwheel input device, a trackstick input device, and so on). The I/O devices 128 may include one or more audio I/O devices, such as a microphone, speakers, and so on. Thus, I/O devices 128 may include a physical (e.g., mechanical) keyboard configured to receive user input. In an implementation, the keyboard may be integrated with the mobile electronic device 104, or the keyboard may be a peripheral device that is configured to interface with the device 104 (e.g., via a USB port, etc.)

The mobile electronic device 102 is illustrated as including a user interface 130, which is storable in memory 116 and executable by the processor 112. The user interface 130 is representative of functionality to control the display of information and data to the user of the mobile electronic device 102 via the display 122. In some implementations, the display 122 may not be integrated into the mobile electronic device and may instead be connected externally using universal serial bus (USB), Ethernet, serial connections, and so forth. The user interface 130 may provide functionality to allow the user to interact with one or more applications 132 (e.g., apps) of the mobile electronic device 102 by providing inputs via the touch panel 124 and/or the I/O devices 128. For example, the user interface 130 may cause an application programming interface (API) to be generated to expose functionality to an application 132 to configure the application for display by the display 122 or in combination with another display. In embodiments, the API may further expose functionality to configure the application 132 to allow the user to interact with an application by providing inputs via the touch panel 124 and/or the I/O devices 128.

Applications 132 (e.g., software subroutines configured for performing specific tasks, etc.) may comprise software that is storable in memory 116 and executable by the processor 112, to perform a specific operation or group of operations to furnish functionality to the mobile electronic device 102. Example applications may include calendar applications, cellular telephone applications, instant messaging applications, email applications, photograph sharing applications, Internet browsing applications address book applications, and so forth.

Figure 1B:
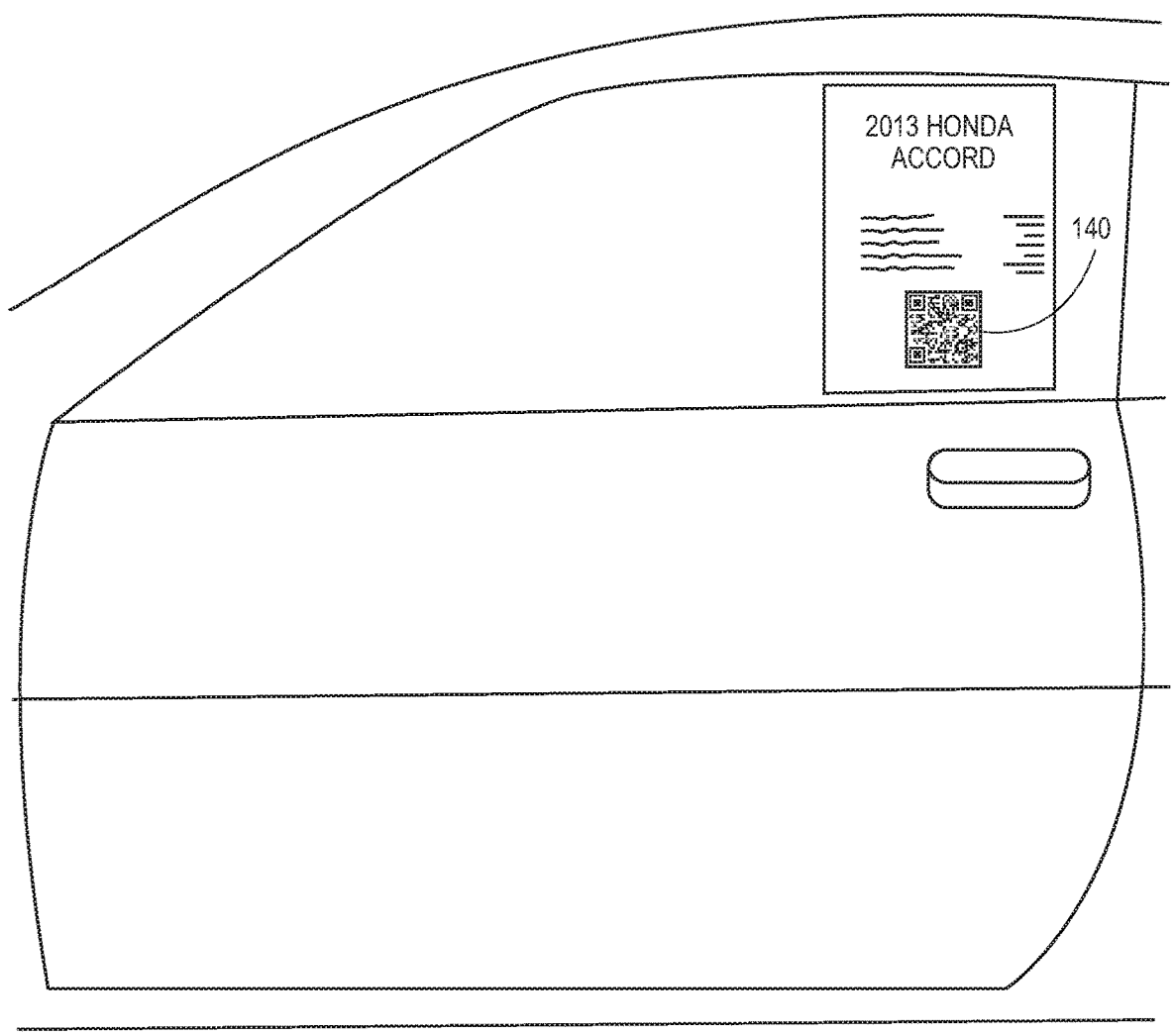
FIG. 1B is diagrammatic side view illustration of a vehicle door having a vehicle information sheet affixed to the vehicle door, the vehicle information sheet including a product identifier that comprises a matrix barcode in accordance with an example implementation of the present disclosure.
Figure 1C:
FIG. 1C is diagrammatic illustration of a Vehicle Identification Number in accordance with an example implementation of the present disclosure.

The mobile electronic device 104 of FIG. 1A may be provided with a camera 133 that is configured to capture content such as still photographs and/or video by digitally recording images using an electronic image sensor. Additionally, the camera 133 is configured to capture one or more product identifiers 140 as well. For example, an identifier 140 may comprise any type of string of characters or barcodes that identifies to a corresponding product. For example, the identifier 140 may comprise, but is not limited to a matrix barcode (i.e., a QR code) as shown in FIG. 1B, a uniform resource identifier, a Vehicle Identification Number as shown in FIG. 1C, an image, a universal product code, or the like. For example, the module 134 may be configured to cross-reference with other servers that contain vehicle history information (i.e., reports) based upon the identifier 140 (e.g., the camera 133 captures the Vehicle Identification Number, which causes the module 134 to interface with one or more servers that have the pertinent vehicle history information and import the pertinent vehicle history information). Thus, the module 134 may be configured to receive the vehicle history information from the servers and then utilize the received history information as the product information.

Content captured by the camera 133 may be stored as digital content in memory 116. In embodiments, the digital image files may be stored using a variety of file formats. For example, digital photographs may be stored using a Joint Photography Experts Group standard (JPEG) file format. Other digital image file formats include Tagged Image File Format (TIFF), Raw data formats, and so on. Digital video may be stored using a Motion Picture Experts Group (MPEG) file format, an Audio Video Interleave (AVI) file format, a Digital Video (DV) file format, a Windows Media Video (WMV) format, and so forth. Exchangeable image file format (Exif) data may be included with digital image files to provide metadata about the image media. For example, Exif data may include the date and time the image content was captured, the location where the content was captured, and the like. Digital image content may be displayed by display 122 and/or transmitted to other devices and/or servers 102 via the communication network 106 (e.g., via an email or MMS text message).

As shown in FIG. 1A, the mobile electronic device 104 includes an aggregator module 134, which is storable in the memory 116 and executable by the processor 112. The aggregator module 134 represents functionality to collect and to aggregate applicant information and/or data associated with a prospective purchasing entity 109D with product information into a commercial application, as described in greater detail herein. For example, the module 134 may be configured to cause presentation of one or more information interfaces (e.g., input fields, etc.) to facilitate collection of the prospective purchasing entity's 109D information (e.g., address, employment information, financial information, etc.), which is described in greater detail below with respect to FIGS. 2B through 2I. The module 134 is also configured to cause transmission of the collected information to the central server 102D via the communication network 106. Thus, the lending entity 109A, the insurance entity 109B, and/or the third-party service provider 109C can access (via each entity's respective server) the information to assist in completion of an entity's 109D commercial application (e.g., a loan application, an insurance application, an extended warranty application, etc.). Additionally, the entity's 109D information may reside on the central server 109D for future accessibility by approved entities. For example, the aggregator module 134 may be a stand-alone application configured to facilitate the completion of a loan application with one or more lending entities 109A that can make funds available (e.g., provide loans) to the prospective purchasing entity 109D. For example, a prospective purchasing entity 109D may be visiting a vehicle dealership. While at the dealership, the prospective purchasing entity 109D may decide he/she wishes to purchase the vehicle. In some instances, the prospective purchasing entity 109D may have been pre-approved in advance of a purchase up to a pre-defined loan amount. In other instances, the entity 109D may wish to apply for a loan on the spot. In an implementation, the prospective purchasing entity 109D can initiate the aggregator module 134 by providing a touch input to the touch-sensitive display 122 corresponding to a graphic representing the module 134. Upon receiving indication of the touch input, the processor 112 is configured to execute the aggregator module 134, as well as various subroutines associated with the aggregator module 134. Additionally, the prospective purchasing entity 109D may locate a product that he or she is interested in purchasing through one or more product identifiers (e.g., utilizing the camera to interface with a matrix barcode, utilizing a uniform resource identifier via an Internet browser to identify one or more vehicles of interest, etc.).

The module 134 is configured to allow the user to create additional information, such as text notes, visual notes (e.g., images), or audible notes, regarding the product (e.g., an asset). For example, the user may manually input text regarding the condition of the product to allow the user to access the notes at a later time. In another example, the module 134 is configured to allow the user to create an audible (e.g., voice recording) note regarding the condition of the product.

Figure 2A:
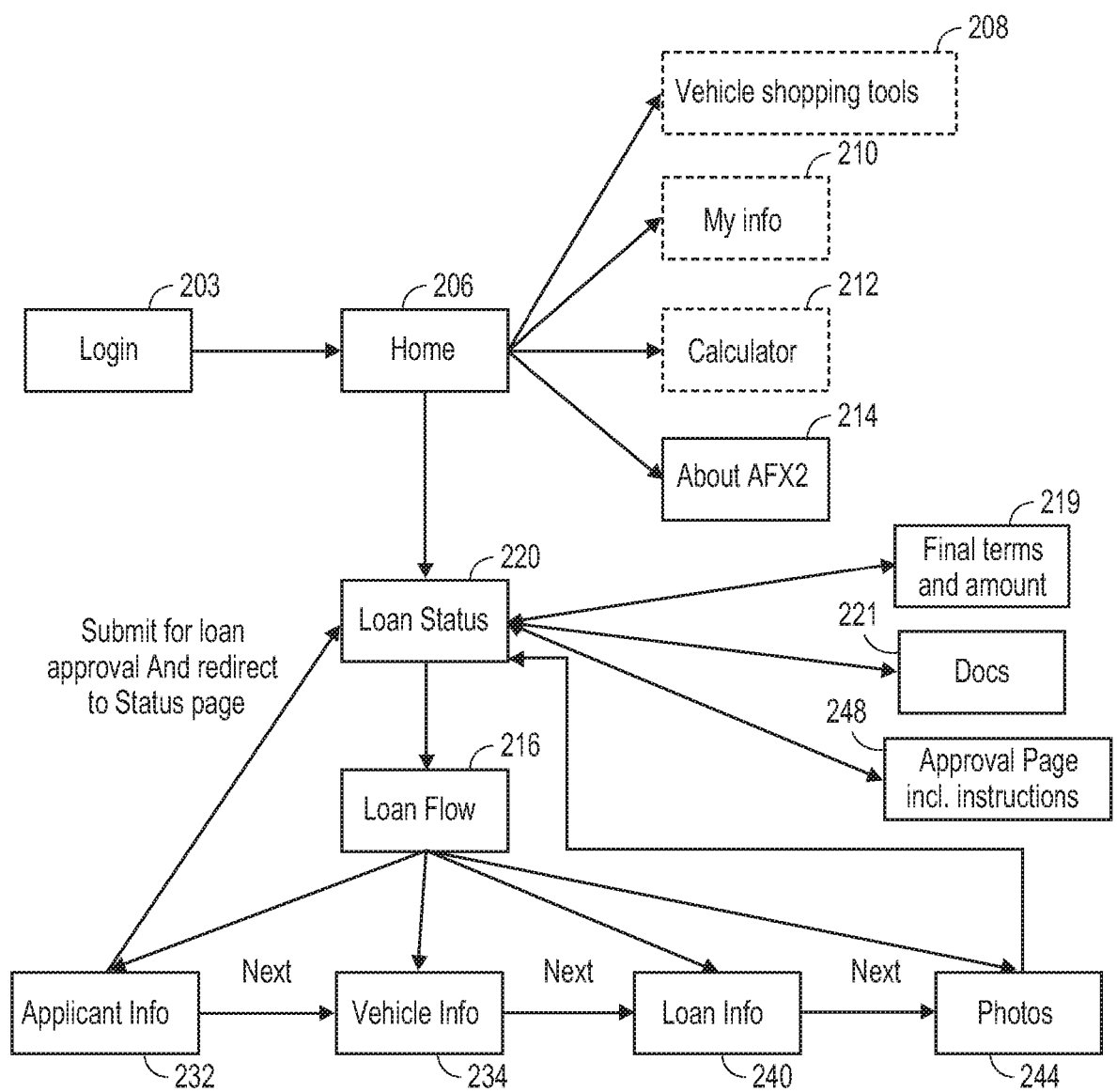
FIG. 2A illustrates an example flow chart depicting a method in accordance with example implementations of the present disclosure.

Upon the prospective purchasing entity 109D initiating the aggregator module 134, the module 134 is configured to cause the processor 112 to provide the entity 109D one or more interfaces and/or graphics associated with one or more loans or loan applications (FIG. 2A). For example, the module 134 may be configured to cause the processor 112 to initiate display of the interactive graphical interface 200. As shown in FIGS. 2B through 2J, the graphical interface 200 includes one or more graphics associated with the aggregator module 134. The graphics may convey information to the prospective purchasing entity 109D regarding details associated with the loan process, interactive graphics for receiving input from the prospective purchasing entity 109D associated with the loan process, and so forth.

Figure 2B:
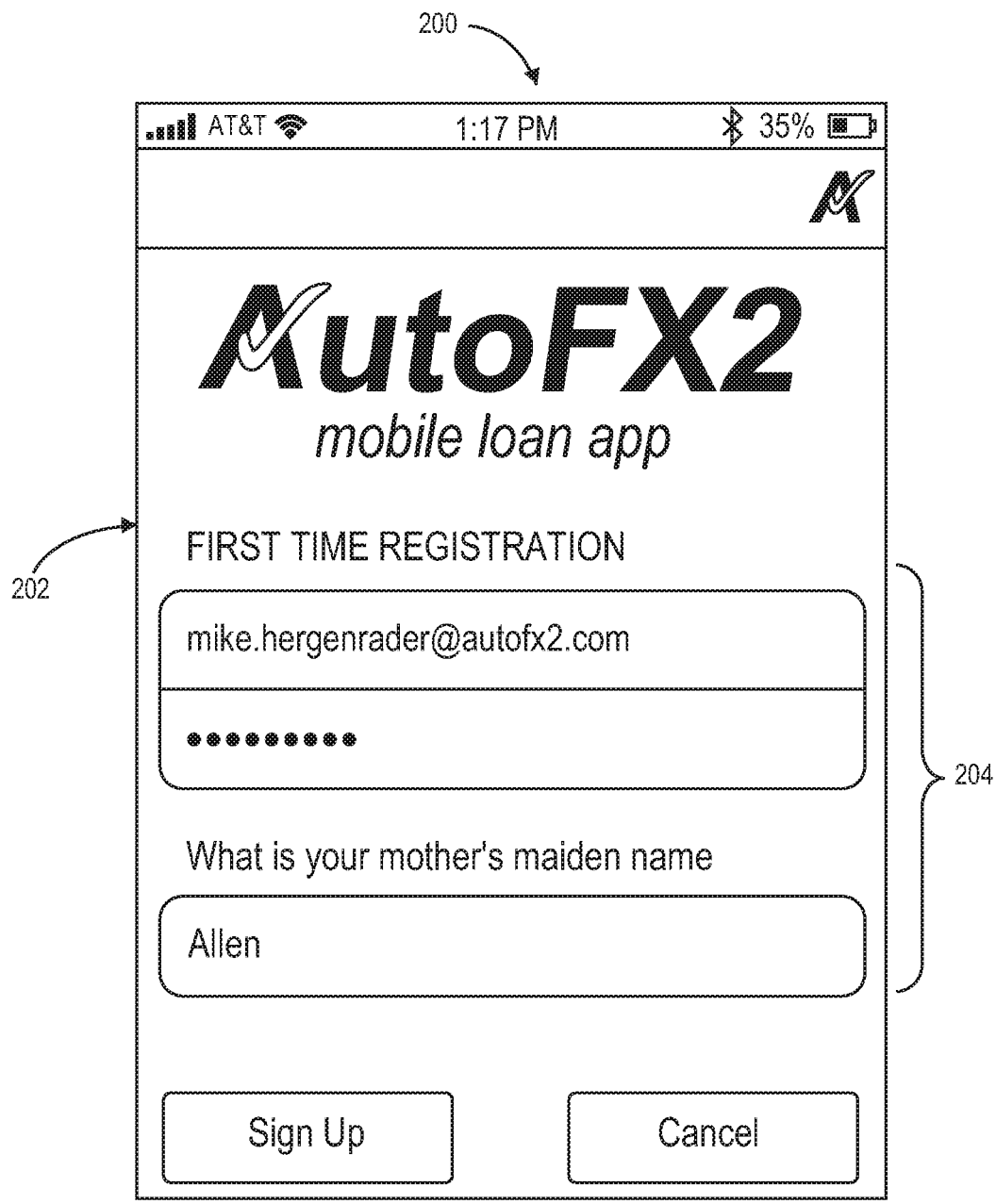
FIGS. 2B through 2J illustrate example screen shots in accordance with example implementations of the present disclosure.

As shown in FIG. 2B, registration graphics 202 are displayed via the display 122. The registration graphics 202 include one or more interactive fields 204 for receiving desired credentials from the prospective purchasing entity 109D. The prospective purchasing entity 109D may required to initially register with a service provider (e.g., lending entity 109A, insurance entity 109B, third-party provider 109C, etc.). For example, the prospective purchasing entity 109D may also be required to supply personal information to a service provider (e.g., insurance company, selling entity, etc.). The personal information may include, but is not limited to: name, address, contact information (e.g., phone number, e-mail, etc.), employer information, financial information, and so forth. The personal information may be stored in and accessible via a database 136. One or more servers 102 (servers 102A, 102B, 102C, 102D) may include a database 136. Once the prospective purchasing entity 109D supplies the proper credentials to authenticate the entity 109D, the module 134 is configured to cause the processor 112 to initiate display of a home page 206 associated with the prospective purchasing entity's 109D account. Upon registering to gain accessibility to the functionality of the module 134, the module 134 is configured to cause the processor 112 to initiate display of a login screen 203 to receive the entity's 109D credentials. In an implementation, the entity's 109D registration information may reside locally on the device 104 until the registration process is complete. Upon completion and validation of the registration information, the device 104 may be configured to upload the registration information to the server 102D.

Figure 2C:
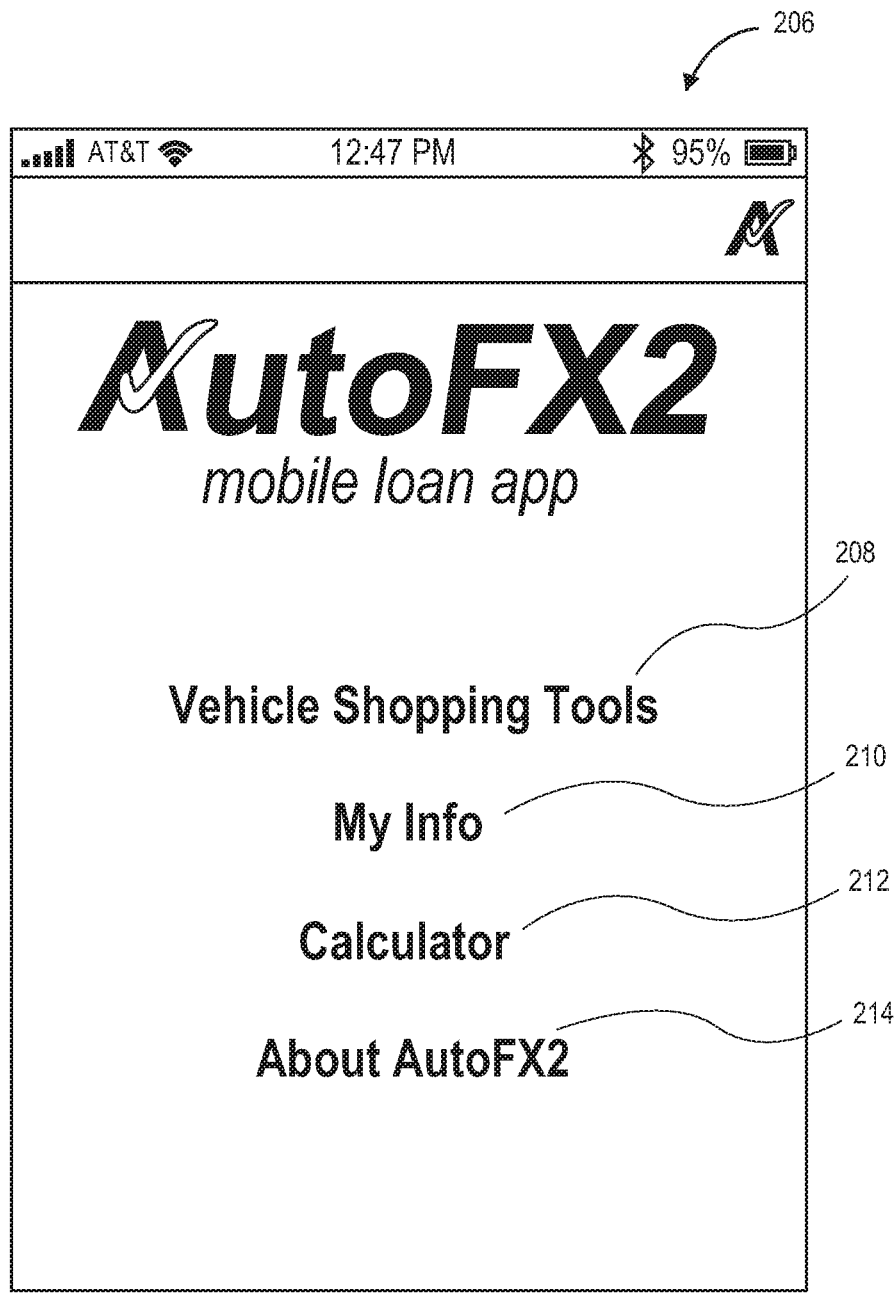
Figure 2D:
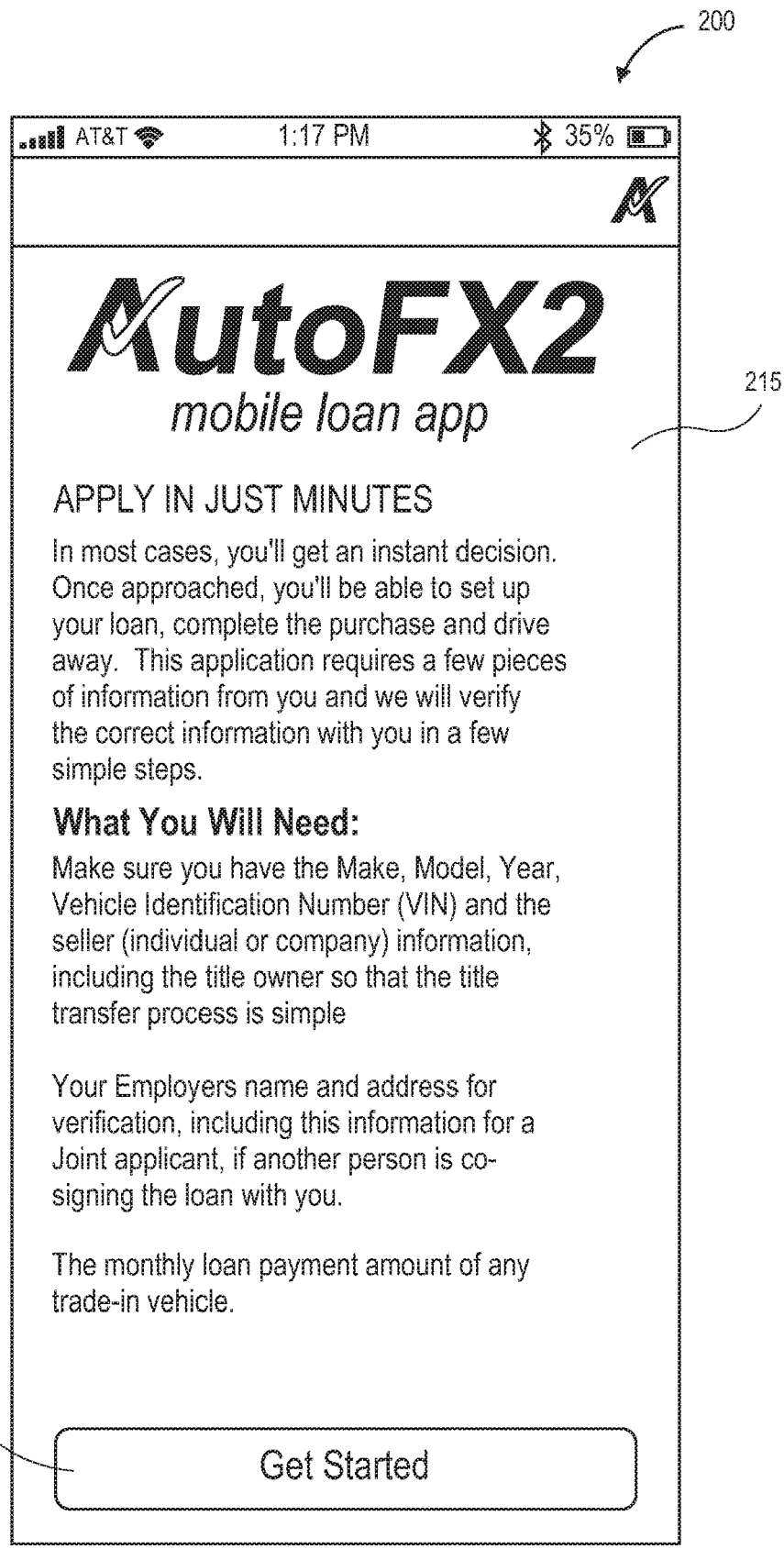
Figure 2E:
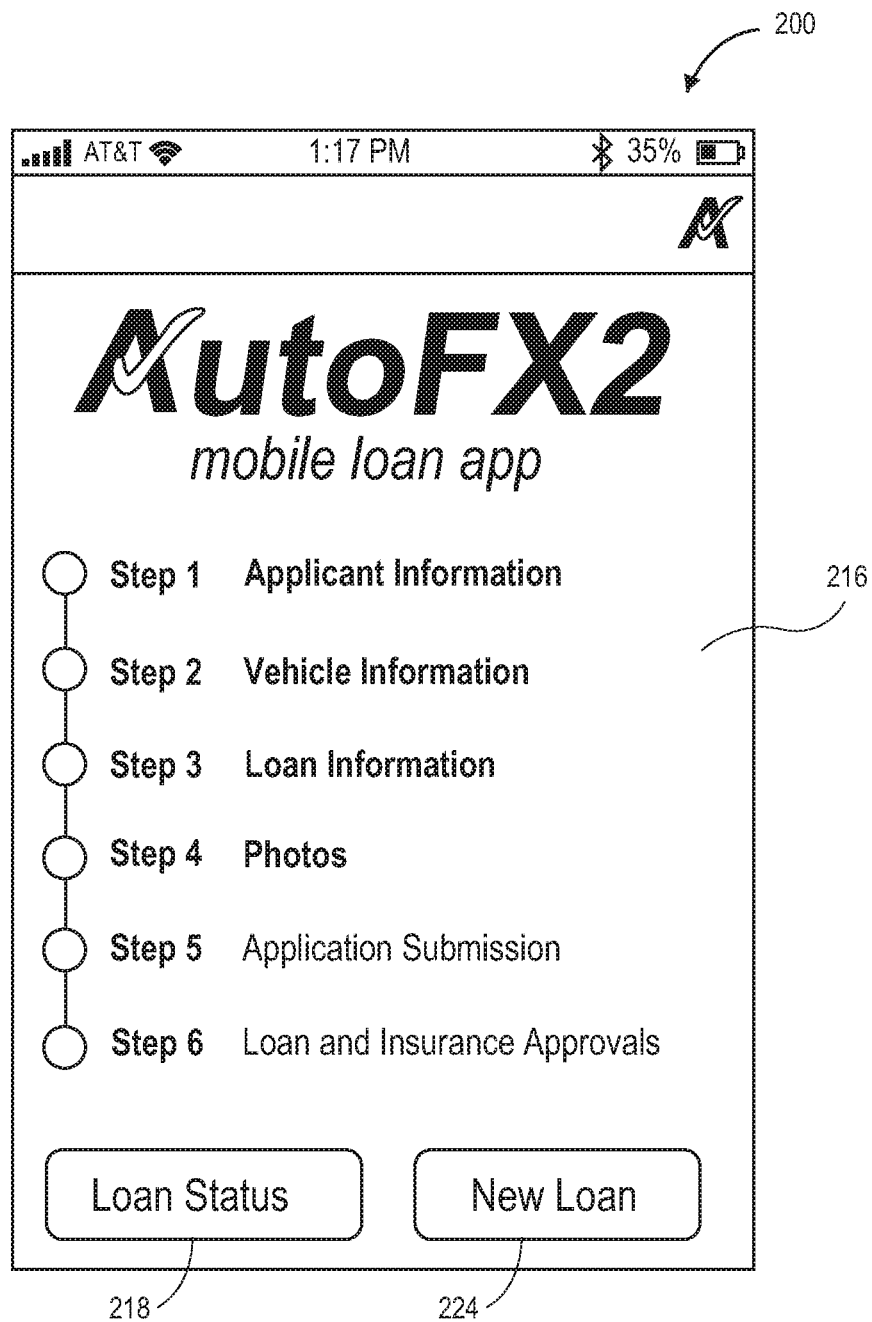

As shown in FIGS. 2A and 2C, the prospective purchasing entity 109D can access one or more subroutines from the home page 206. In an implementation, the home page 206 may provide an interface (e.g., a graphical representation of a button, etc.) to a "Vehicle Shopping Tools" subroutine 208, a "My Info" subroutine 210, a "Calculator" subroutine 212, or an "About" subroutine 214 (see FIG. 2C). The prospective purchasing entity 109D can initiate the various subroutines 208, 210, 212, 214 via one or more graphical interfaces that are configured to actuate the subroutines 208, 210, 212, 214 (e.g., activate specific functionality associated with the subroutines). The home page 206 also provides access to various loan tools. For example, the prospective purchasing entity 109D can access an interface to initiate a loan subroutine from the home page 206 (e.g., the home page 206 includes an interactive menu/button that allows the entity 109D to access one or more subroutines associated with the module 134). The subroutine may cause the processor 112 to initiate display of one or more graphics that furnishes loan information and/or loan application information to the user. For example, the entity 109D can select an interactive graphic that causes the execution of a subroutine to cause the display of a loan application information page 215 (see FIG. 2D). The loan application information page 215 may include an interface 217 that allows the module 134 to cause the processor 112 to redisplay the home page 206. In another example, as shown in FIG. 2E, the module 134 is configured to cause the processor 112 to initiate a display of a loan flow page 216 at the display 122. However, it is understood the prospective purchasing entity 109D can also select an interactive graphic that causes the execution of a subroutine to cause the display of another information page associated with another commercial service related to a product (e.g., insurance application information page, warranty application information page, etc.).

The loan flow page 216 may convey various steps required to complete a loan application. The steps may include, but are not limited to: "Applicant Information," "Vehicle Information," "Loan Information," and "Photos" (see FIG. 2E). The loan flow page 208 may also include one or more interactive graphics. In an implementation, the interactive graphics may include a loan status interactive graphic 218, that when actuated by the entity 109D, is configured to convey a graphical representation of the status of one or more loan applications (e.g., a loan status page 220) associated with the entity 109D (see FIG. 2F). Upon selection of the graphic 218, the aggregator module 134 causes the processor 112 to initiate display of the loan status page 220. The loan status page 220 includes one or more interactive graphics 222 that convey information regarding the status of the one or more loan applications (e.g., a completion percentage, etc.). The entity 109D may select the interactive graphics 222 to receive additional information relating to the corresponding loan application. For example, upon selection of a graphic 222, the module 134 causes the processor 112 to initiate display of graphics configured to convey information relating to the corresponding loan. The information may include, but is not limited to: status of the loan (e.g., submitted, loan amount approved by the lending entity 109A, repayment options); final terms of the loan (see Block 219 in FIG. 2A); product information associated with the loan application (e.g., a vehicle's model year, hyperlink to a product page associated with the vehicle); documents associated with the loan application (e.g., promissory note, copy of the loan application, etc.) (see Block 221 in FIG. 2A); interactive graphics configured to allow the entity 109D to modify the loan application (e.g., modify the length of the loan, modify the requested amount, etc.); and so forth. The loan status page 220 may also include an interactive graphic 224 to allow the entity 109D to create a new loan application, which is described below.

Figure 2F:
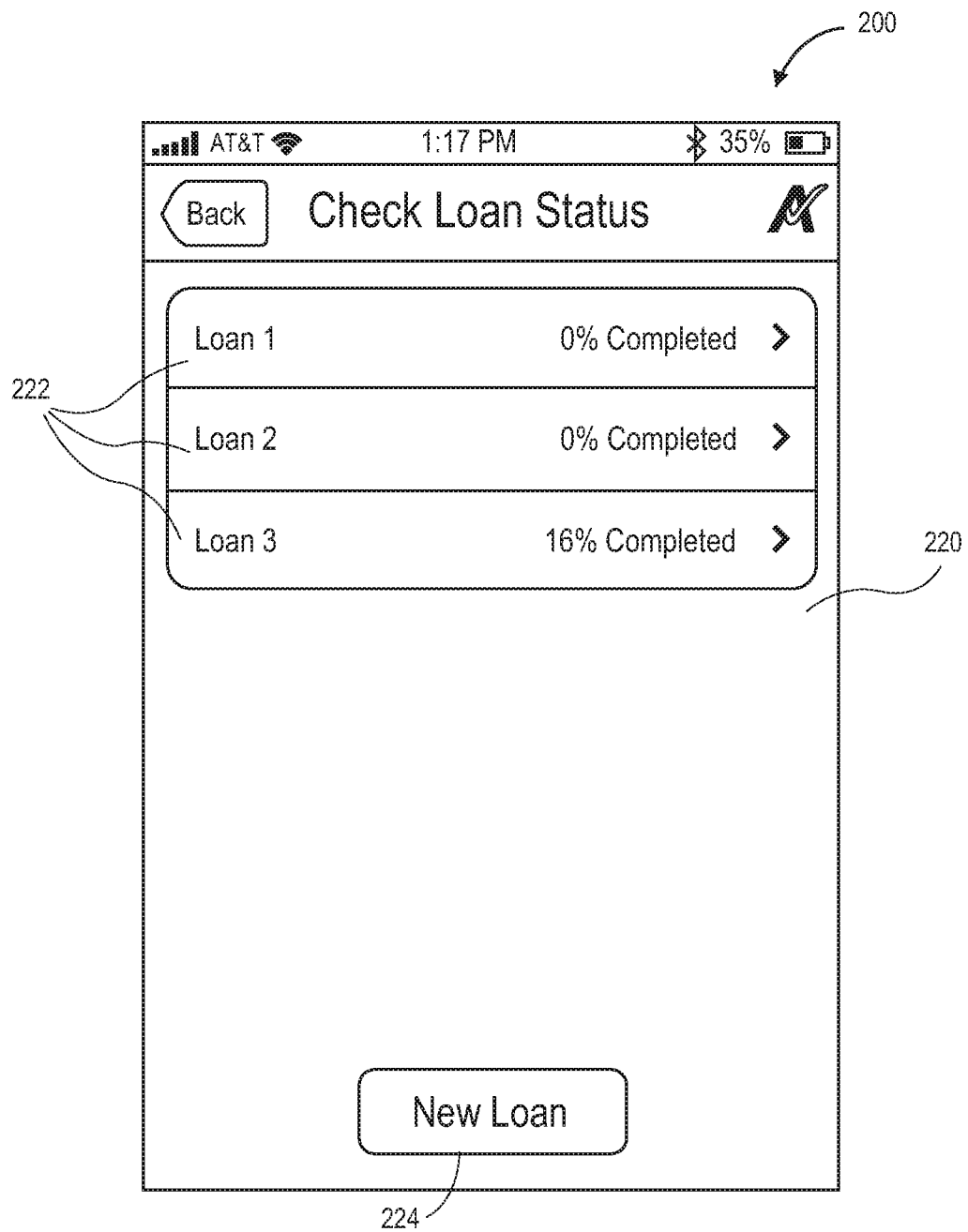
Figure 2G:
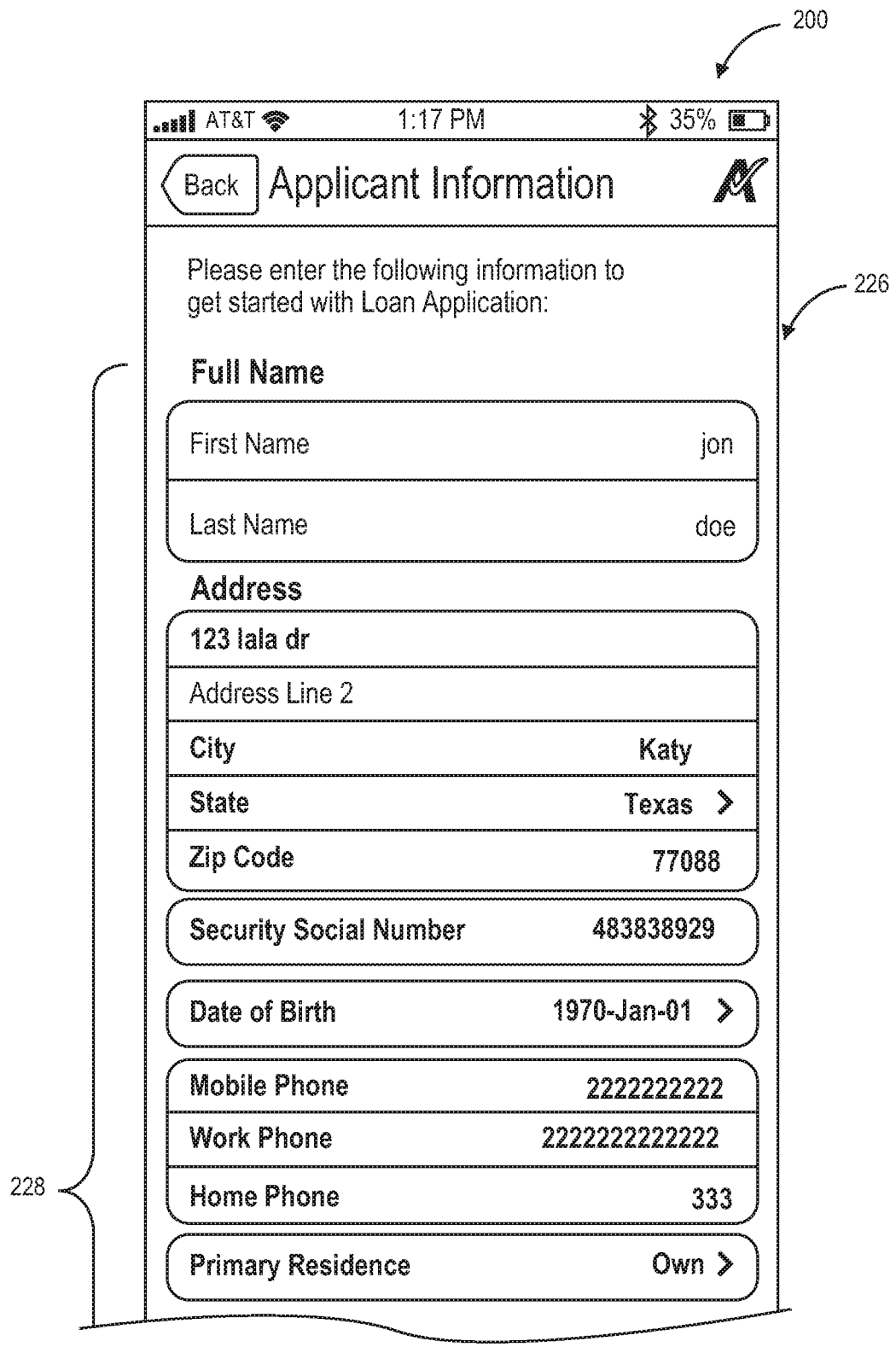
Figure 2G:
Figure 2H:
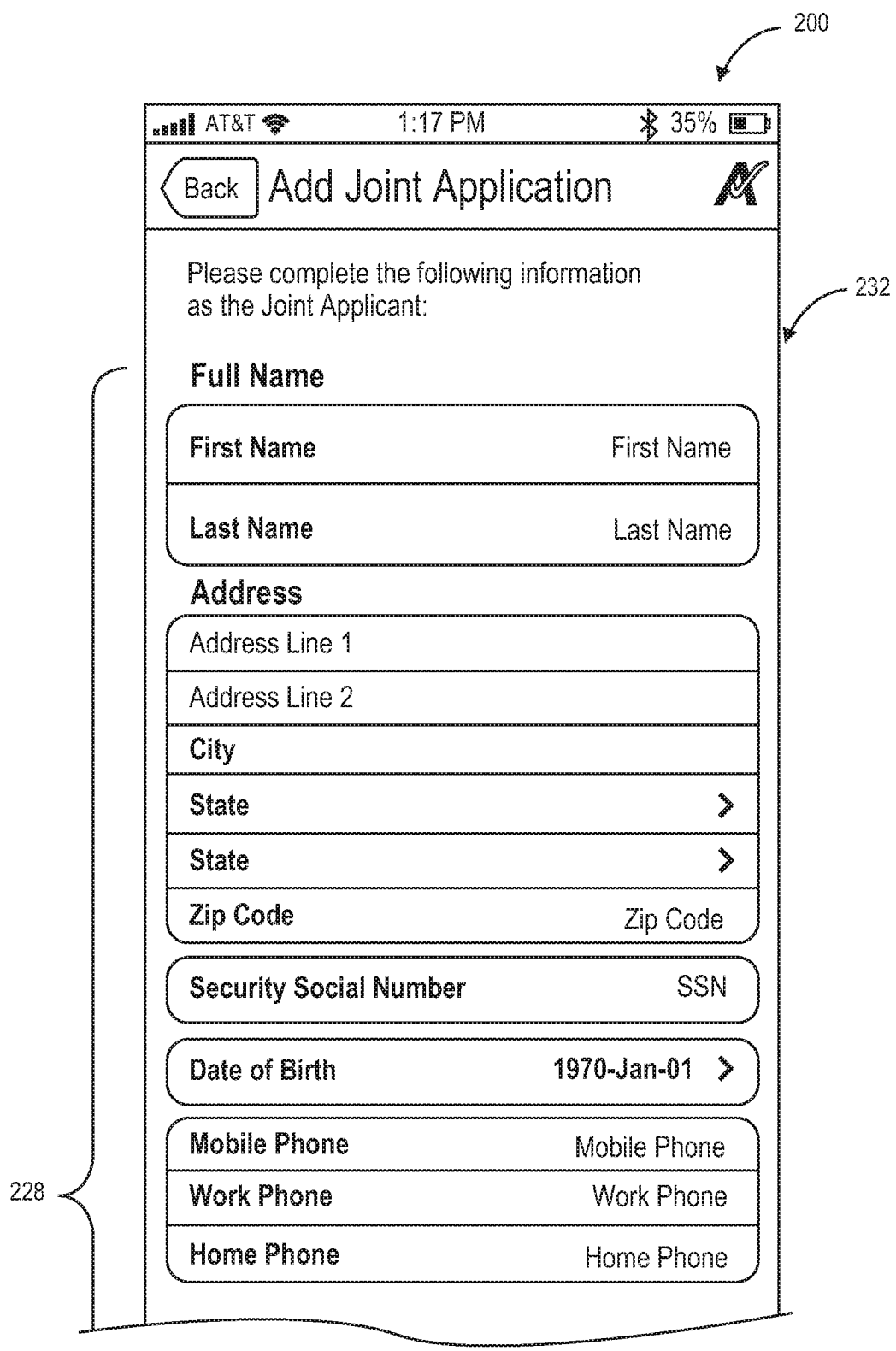

As shown in FIGS. 2E and 2F, the loan flow page 216 and the loan status page 220 may each include a "New Loan" interface graphic 224 that is representative of allowing the entity 109D to access a new loan application. As shown in FIG. 2G, upon actuating the graphic 224, the module 134 is configured to cause the processor 112 to initiate display of an applicant information page 226. The applicant information page 226 includes input fields 228 configured to receive entity 109D information, which may be required by the lending entity 109A to approve a loan for the entity 109D. The applicant information page 226 may include a joint applicant interface 230 that, when actuated, causes the module 134 to instruct the processor 112 to display a joint applicant information page 232 (see FIG. 2H). As shown, the joint applicant information page 232 includes input fields 228 for receiving a joint applicant's information.

Figure 2I:
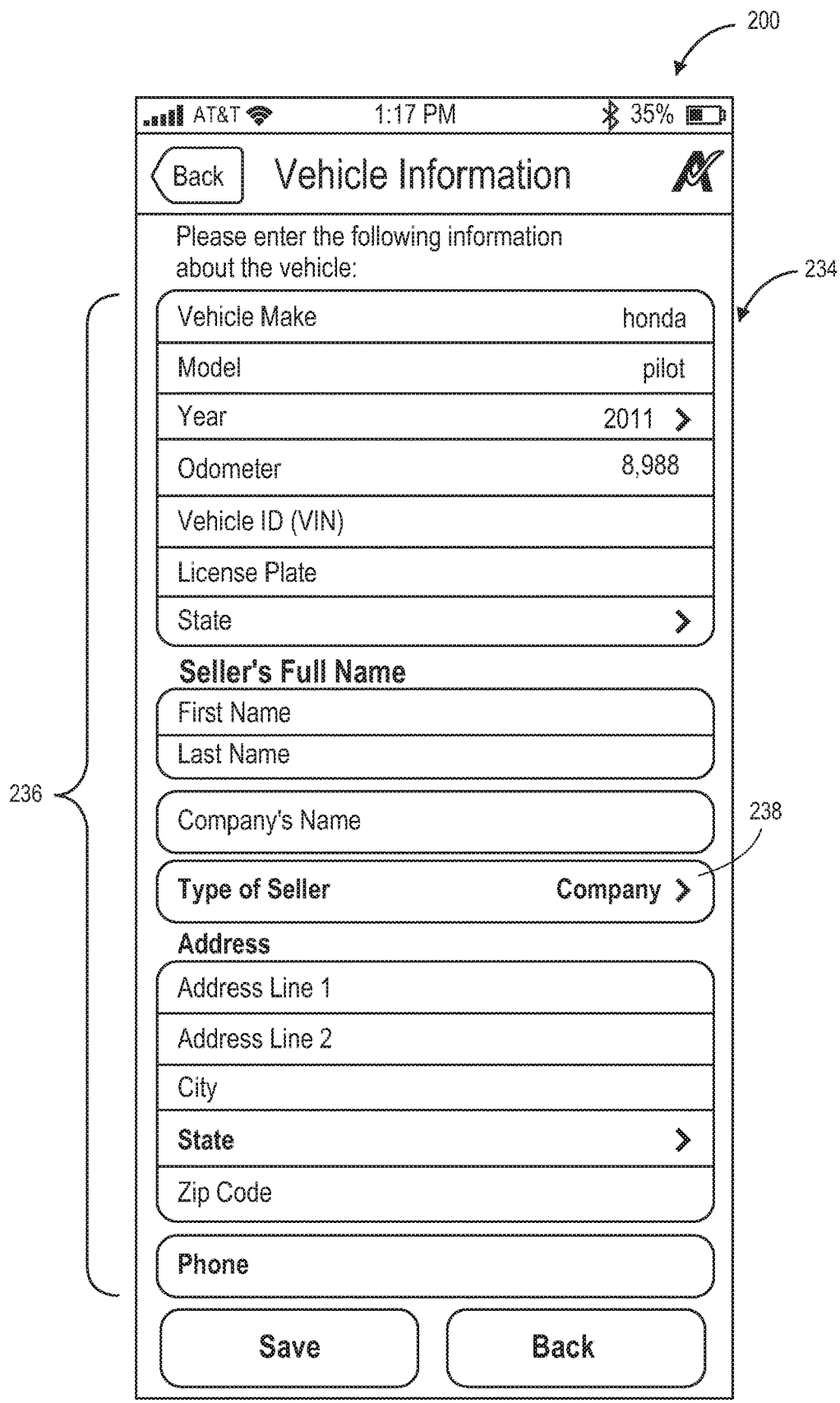

Upon completing the applicant information (e.g., pages 226, 232), the module 134 is configured to instruct the processor 112 to a product information page 234 (see FIG. 2I). In an implementation, the product information page 234 is a vehicle information page, or the like. The product information page 234 includes input fields 236 for receiving product (e.g., vehicle, etc.) information. The product information page 234 also includes a seller type interface 238 for allowing the entity 109D to select the type of seller (e.g., a vehicle dealership, a private seller, a product auction, etc.). It is contemplated that the product information can also be captured in the product shopping tools section (208) and that the information for multiple vehicles may be captured in order to support the purchasing decision process and only one product may be associated with the loan application. Additionally, the product information pertaining to the product may be provided, or auto-populated, via one or more identifiers 140. For example, the module 134 may be configured to retrieve product information when the prospective purchasing entity 109D utilizes the camera 133 to capture an identifier 140 associated with the product (e.g., a QR code presented within product documentation affixed to the vehicle, a Vehicle Identification Number, etc.). In some implementations, the product identifier 140 may include metadata relating to the product. For example, the metadata may include geographical information regarding the product, a condition of the product, price information of the product, history of the product (e.g., vehicle history, mileage, etc.), or the like.

Figure 2J:
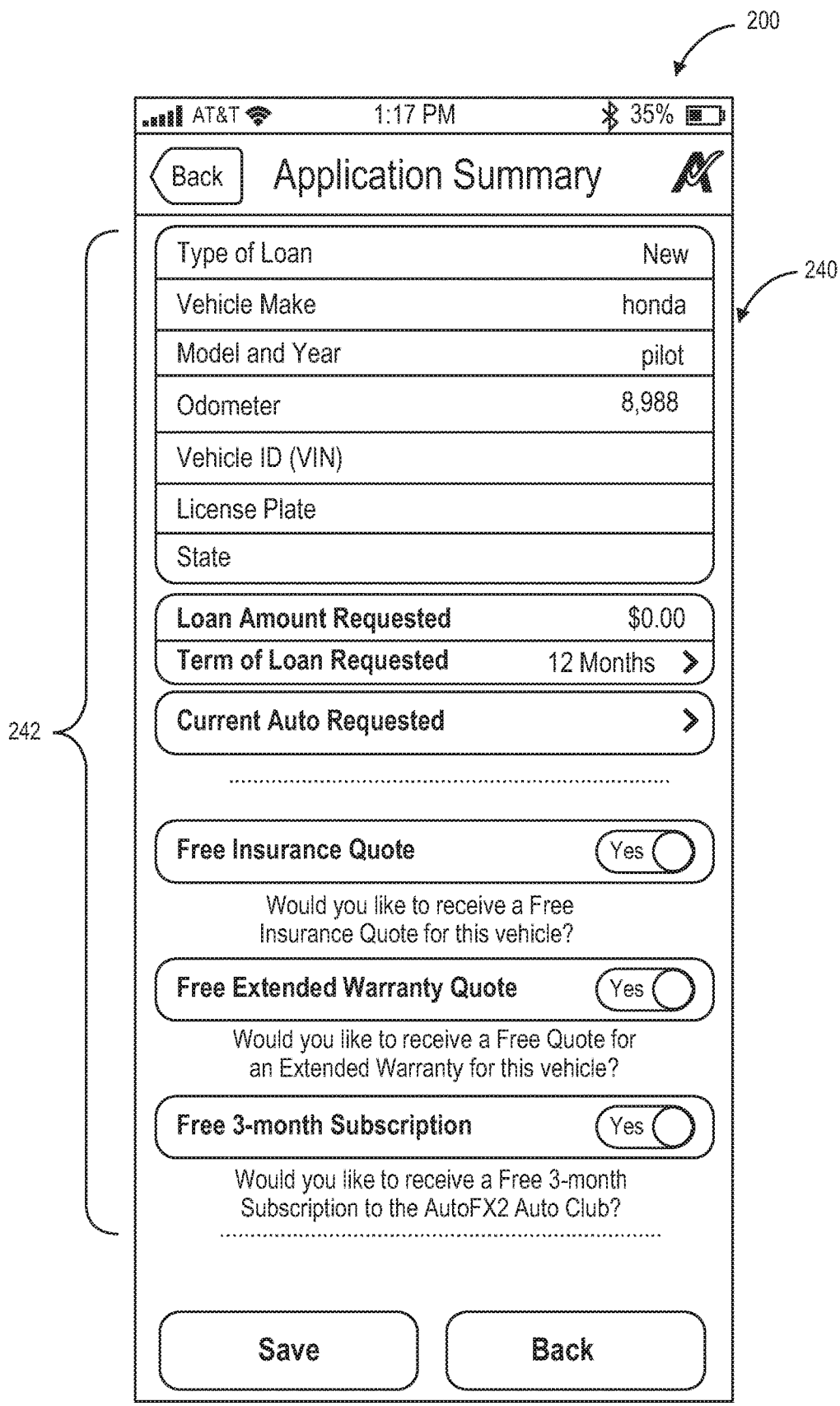

Once the product information has been completed, the module 134 is configured to cause the processor 112 to display a loan information page 240 (see FIG. 2J). As shown in FIG. 2J, the loan information page 240 includes one or more input fields 242 for receiving information associated with the loan application. The type of information included in the page 240 may include, but is not limited to: type of loan, vehicle make, vehicle model, loan amount requested, term of loan, insurance information associated with the vehicle, and the like. The prospective purchasing entity may also select from one or more lending entities 109A. For example, the prospective purchasing entity may select from a predetermined list of potential lending entities for which the prospective purchasing entity wishes to submit a loan application. In an implementation, the module 134 may be configured to allow the prospective purchasing entity 109D to interface with an insurance company to receive insurance information (e.g., policy quotes) and/or buy insurance (e.g., policy execution) for the vehicle. For example, the module 134 may include an application programming interface (API) configured to cause the processor 112 to interact with an online insurance provider (e.g., insurance entity 109B). The module 134 may also include an API configured to allow the entity 109D to interface with other third-party service providers 109C.

Next, as shown in FIG. 2A (see Block 244), the entity 109D may be required to capture digital content representing the state of the product (e.g., physical condition of the vehicle, etc.) via the camera 133. For example, as a condition before completion of the commercial application, a lending entity 109A, an insurance entity 109B, and/or a third-party service provider 109C may require documented evidence of the condition of a product and/or collateral. The entity 109D may capture still photographs and/or videos that represent the physical condition of a vehicle the entity 109D wishes to purchase with a loan from the lending entity 109A as the lending entity 109A may wish to have documentation of the condition of the vehicle for which the entity 109A is making funds available for (e.g., lending money to the entity 109A to purchase the vehicle). Additionally, the insurance entity 109B may require documentation (e.g., digital photographs, digital videos) of the condition of the product to be insured, which can be uploaded to the server 102D. It is also contemplated that the lending entity 109A may require documentation of the condition of collateral offered by the entity 109D. Thus, the entity 109D can create digital content (e.g., photos, videos) of the condition of the collateral by way of the camera 133. The module 134 is configured to cause the uploading of the digital content to the server 102D, which is then accessible to the lending entity 109A, the insurance entity 109B, the third-party service provider 109C, and/or any other authorized entity.

In an implementation, the mobile electronic device 104 may include a location determining system. In embodiments, the location determining system may be a global positioning system (GPS) receiver operable to receive navigational signals from GPS satellites and to calculate a location of the mobile electronic device as a function of the signals. Thus, the module 134 may be additionally configured to furnish geographical (GeoTagging) information to the digital content described above. For example, the module 134 may be configured to cause the processor 112 to include geographical identification metadata with the digital content (e.g., photographs, videos, etc.) captured by the camera 133. For instance, GPS information may be included, or attached, to the digital content at nearly the time the digital content is created. In another instance, the GPS information may be included in the digital content at a time occurring after the digital content is created. The geographical information may include, but is not limited to: latitude and longitude coordinates, place names, and so forth. The geographical information may be included in the digital content to furnish location-specific information to one or more of the entities 109A, 109B, 109C to assist in the completion of the commercial application (e.g., loan application, insurance application, extended warranty application, etc.). For example, the lending entity 109A may wish to ensure the vehicle for which the loan is sought for is located at the designated vehicle dealership.

Once the entity 109D has input the required information (e.g., applicant information, vehicle information, loan information, digital content), the module 134 may instruct the processor 112 to cause all the required information to be sent (e.g., via communication module 120) to the server 102D. It is contemplated that the module 134 may instruct the processor 112 to cause the information to be sent to the centralized server 102D in at least substantially real-time, at period intervals, or the like. It is also contemplated that the required information may be maintained locally on the mobile electronic device 104 (e.g., memory 116). As shown in FIG. 1A, the server 102A may include a set of lending requirements 138 for loan pre-approval. These lending requirements may be pre-defined by each lending entity 109A. The processor 110 of the server 102A may be instructed to compare the lending requirements to the provided required information, which was provided by the central server 102D. If at least substantially all of the lending requirements are met, or attained, the processor 110 may be configured to cause an approval document to be transmitted to the mobile electronic device 104 (see Block 246 of FIG. 2A). The approval document may include information conveying that a loan has been pre-approved, instructions for moving forward in financing the purchase, and/or other requirements set forth by the lending entity 109A. Upon receiving the approval document, the processor 112 may be instructed to initiate display of the approval document via the display 122. As described above, the module 134 is configured to facilitate the completion of commercial applications by collecting and uploading information pertaining to the commercial applications to a centralized server 102D. While one example of a commercial application, the loan application, was described above, it is understood that other commercial applications (e.g., insurance applications, warranty applications) may be completed in a similar manner.

Figure 3:
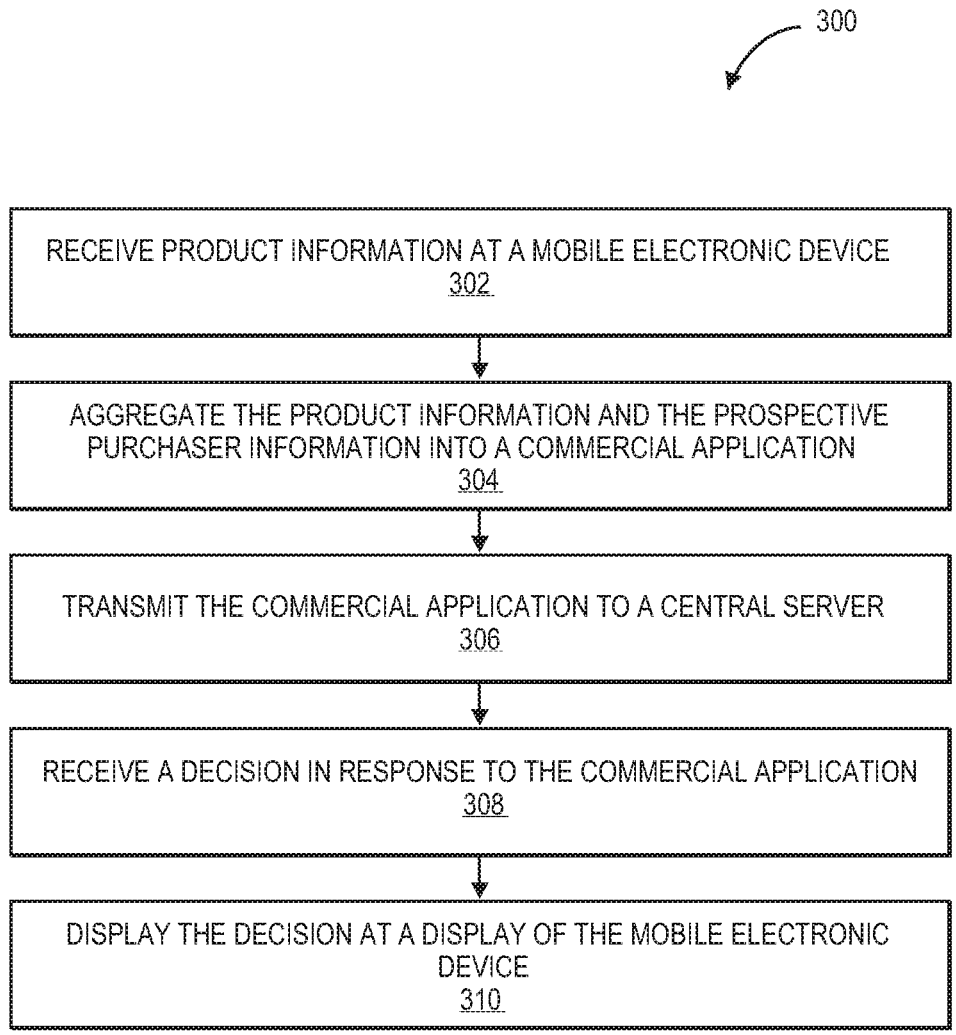
FIG. 3 is a flow diagram illustrating an example method for aggregating product information and prospective user information into a commercial application in accordance with an example implementation of the present disclosure.

FIG. 3 illustrates an example method 300 for submitting product information to a centralized repository (e.g., a central server 102D) in accordance with an example implementation of the present disclosure. As shown in FIG. 3, product information is received at a mobile electronic device (Block 302). In one or more implementations, a mobile electronic device 109D of a prospective purchasing entity receives product information pertaining to a product that the prospective purchasing entity is interested in purchasing. For example, the device 109D may be configured to capture an image of a product identifier 140 via the camera 133. In another example, the user (entity) may input a uniform resource locator that represents the product identifier 140. Utilizing the product identifier 140, the module 134 is configured to auto-populate product information derived from the identifier 140. In another example, the user may manually input the product information into the device 109D, as shown in FIGS. 2I and 2J.

As shown in FIG. 3, product information and prospective purchaser information is aggregated into a commercial application (Block 304). As described above, the module 134 is configured to aggregate the supplied prospective purchasing entity information and the product information into a commercial application, such as an application for a loan, an application for insurance, an application for a warranty, and so forth. The commercial application is transmitted to a central server (Block 306) for storage and servicing purposes. As described above, once the prospective purchasing entity has provided the required submission information, the device 109D is configured to transmit (e.g., upload) an application (e.g., a loan application, a service application, a warranty application, an insurance application) the product information and personal information to the central server 102D. Various entities 109A, 109B, 109C may then be alerted to the submission of the information uploaded. For example, a lending entity 109A may be alerted that a new loan application has been submitted and provide a loan decision in response thereto. In another example, an insurance entity 109B may provide an insurance quote for insuring the product based upon the product information provided within the application.

In another implementation, the product information may include collateral information for securing a loan from the lending entity 109A. For example, the user may be required to provide collateral in order to secure a loan from the lending entity 109A. Thus, the product information may further include pictures representing the condition of the collateral, information representing one or more aspects of the collateral, geographical information representing the geographical position of the collateral, and so forth.

As shown in FIG. 3, a decision from a service provider in response to the commercial application is received at the mobile electronic device (Block 308). As described above, one or more providers or entities 109A, 109B, 109C can access the application stored within the server 102D. The providers/entities 109A, 109B, 109C provide a decision in response to the provided application. For example, the decision may be offer to provide a loan (or other services) based upon an acceptance of the terms from the respective entity 109A, 109B, 109C. For instance, the decision may be an automated loan offer because the supplied information is within one or more pre-approval settings of the lending entity 109A. In another example, the decision comprises a denial of services requested through the commercial application. For instance, a denial may be issued since an insufficient amount of information was supplied by the prospective purchaser or the entity 109A, 109B, 109C requires additional information from the prospective purchaser. The decision is then displayed at the display of the mobile electronic device (Block 310). In one or more implementations, the module 134 is configured to cause the display of the decision at the display of the device 109D.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable medium with one or more modules stored thereon, the one or more modules, when executed by a processor of a mobile device, causing the processor to:
    receive at least one of a photograph or a video of a product captured by a camera of the mobile device;
    receive geographical information associated with the at least one of the photograph or the video from a location determining system of the mobile device;
    retrieve product information associated with the product;
    generate digital content comprising the at least one of the photograph or the video and the geographical information and at least one of a time characteristic or a date characteristic corresponding to the product, the digital content representing a physical condition of the product;
    aggregate the product information and the digital content with applicant information to generate or modify a commercial application relating to the product, the commercial application comprising an application for services from a remote entity comprising at least one of a lending entity, an insurance entity, or a third-party service entity;
    cause transmission of the product information, the digital content, and the applicant information to a central server, wherein the at least one of the lending entity, the insurance entity, or the third-party service entity utilizes the digital content to validate the geographical information and the at least one of the time characteristic or the date characteristic corresponding to the product and to validate the condition of the product prior to providing a decision pertaining to the commercial application.

2. The non-transitory computer-readable medium of claim 1, wherein the one or more modules, when executed by the processor of the mobile device, further cause the processor to retrieve the decision pertaining to the commercial application.

3. The non-transitory computer-readable medium as recited in claim 1, wherein the decision comprises at least one of an offer to provide services as applied for within the commercial application or a denial to provide services as applied for within the commercial application.

4. The non-transitory computer-readable medium as recited in claim 1, wherein the commercial application comprises an application for a loan.

5. The non-transitory computer-readable medium as recited in claim 1, wherein the product information is associated with a product identifier.

6. The non-transitory computer-readable medium of claim 5, wherein the one or more modules, when executed by the processor of the mobile device, cause the processor to retrieve the product information from a database based on the product identifier.

7. The non-transitory computer-readable medium of claim 5, wherein the one or more modules, when executed by the processor of the mobile device, cause the processor to retrieve the product information from at least one server over a communication network based on the product identifier.

8. The non-transitory computer-readable medium of claim 5, wherein the one or more modules, when executed by the processor of the mobile device, further cause the processor to derive the product information from the product identifier.

9. The non-transitory computer-readable medium as recited in claim 5, wherein the product identifier comprises at least one of a matrix barcode or a Vehicle Identification Number.

10. The non-transitory computer-readable medium as recited in claim 1, wherein the product information comprises a condition of the product, a purchase price of the product, and a description of the product.

11. A non-transitory computer-readable medium with one or more modules stored thereon, the one or more modules, when executed by a processor of a mobile device, causing the processor to:
receive at least one of a photograph or a video of a product captured by a camera of the mobile device;
receive geographical information associated with the at least one of the photograph or the video from a location determining system of the mobile device;
retrieve product information associated with the product;
generate digital content comprising the at least one of the photograph or the video and the geographical information and at least one of a time characteristic or a date characteristic corresponding to the product, the digital content representing a physical condition of the product;
aggregate the product information and the digital content with applicant information to generate a commercial application relating to the product, the commercial application comprising an application for services from a remote entity comprising at least one of a lending entity, an insurance entity, or a third-party service entity;
cause transmission of the commercial application to a central server, wherein the at least one of the lending entity, the insurance entity, or the third-party service entity utilizes the digital content to validate the geographical information and the at least one of the time characteristic or the date characteristic corresponding to the product and to validate the condition of the product prior to providing a decision pertaining to the commercial application.

12. The non-transitory computer-readable medium of claim 11, wherein the one or more modules, when executed by the processor of the mobile device, further cause the processor to retrieve the decision pertaining to the commercial application.

13. The non-transitory computer-readable medium as recited in claim 11, wherein the decision comprises at least one of an offer to provide services as applied for within the commercial application or a denial to provide services as applied for within the commercial application.

14. The non-transitory computer-readable medium as recited in claim 11, wherein the commercial application comprises an application for a loan.

15. The non-transitory computer-readable medium as recited in claim 11, wherein the product information is associated with a product identifier.

16. The non-transitory computer-readable medium of claim 15, wherein the one or more modules, when executed by the processor of the mobile device, cause the processor to retrieve the product information from a database based on the product identifier.

17. The non-transitory computer-readable medium of claim 15, wherein the one or more modules, when executed by the processor of the mobile device, cause the processor to retrieve the product information from at least one server over a communication network based on the product identifier.

18. The non-transitory computer-readable medium of claim 15, wherein the one or more modules, when executed by the processor of the mobile device, further cause the processor to derive the product information from the product identifier.

19. The non-transitory computer-readable medium as recited in claim 15, wherein the product identifier comprises at least one of a matrix barcode or a Vehicle Identification Number.

20. The non-transitory computer-readable medium as recited in claim 11, wherein the product information comprises a condition of the product, a purchase price of the product, and a description of the product.

* * * * *